(12) United States Patent
Aubele et al.

(10) Patent No.: US 9,341,211 B2
(45) Date of Patent: May 17, 2016

(54) STRUCTURED DIRT DEPOSITORY IN SLIDING BEARING SURFACES

(75) Inventors: Thomas Aubele, Undenheim (DE); Stefan Rittmann, Kirchheimbolanden (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 47 days.

(21) Appl. No.: 13/820,389

(22) PCT Filed: May 23, 2011

(86) PCT No.: PCT/EP2011/058336
§ 371 (c)(1),
(2), (4) Date: May 22, 2013

(87) PCT Pub. No.: WO2012/028345
PCT Pub. Date: Mar. 8, 2012

(65) Prior Publication Data
US 2013/0230263 A1 Sep. 5, 2013

(30) Foreign Application Priority Data

Sep. 2, 2010 (DE) .......................... 10 2010 040 158

(51) Int. Cl.
*F16C 33/10* (2006.01)
*F16C 9/04* (2006.01)
*F16C 17/24* (2006.01)
*F16C 33/14* (2006.01)

(52) U.S. Cl.
CPC ................. *F16C 9/04* (2013.01); *F16C 17/246* (2013.01); *F16C 33/10* (2013.01); *F16C 33/105* (2013.01); *F16C 33/106* (2013.01); *F16C 33/1065* (2013.01); *F16C 33/14* (2013.01); *F16C 2240/42* (2013.01); *Y10T 29/49668* (2015.01)

(58) Field of Classification Search
CPC .... F16C 33/10; F16C 33/1025; F16C 33/103; F16C 33/105; F16C 33/106; F16C 33/1065; F16C 33/1085; F16C 17/00; F16C 17/02; F16C 17/022; F16C 17/24; F16C 17/246; F16C 9/04
USPC ........................................... 384/286–293, 392
See application file for complete search history.

(56) References Cited

U.S. PATENT DOCUMENTS 1,597,429 A * 8/1926 Brincil .......................... 384/292
3,552,807 A 1/1971 Blount
(Continued)

FOREIGN PATENT DOCUMENTS

| CN | 1485552 A | 3/2004 |
|---|---|---|
| DE | 339 649 C | 7/1921 |
| DE | 27 11 983 A1 | 9/1977 |
| DE | 29 46 921 A1 | 6/1980 |

(Continued)

*Primary Examiner* — Alan B Waits
(74) *Attorney, Agent, or Firm* — Robert L. Stearns; Dickinson Wright, PLLC (57) ABSTRACT

The invention relates to a sliding bearing and to a method for producing a sliding bearing, having at least one groove formed on the sliding surface which extends at least partially in the axial direction of a mounted shaft, ends on at least one end before the edge of the bearing and is deeper than 80 μm and/or wider than 150 μm, so that dirt and/or particles can be embedded.

17 Claims, 6 Drawing Sheets

(56) References Cited

U.S. PATENT DOCUMENTS

| | | | | |
|---|---|---|---|---|
| 4,105,267 A * | 8/1978 | Mori | | 384/291 |
| 6,491,438 B1 * | 12/2002 | Ono et al. | | 384/288 |
| 6,991,377 B2 * | 1/2006 | Yamamoto et al. | | 384/291 |
| 2001/0000073 A1 * | 3/2001 | Kobayashi et al. | | 384/100 |
| 2003/0059136 A1 * | 3/2003 | Takahashi | | 384/100 |
| 2003/0156769 A1 * | 8/2003 | Whang | | 384/291 |
| 2005/0201647 A1 * | 9/2005 | Kuroda et al. | | 384/291 |
| 2008/0187259 A1 * | 8/2008 | Ishigo et al. | | 384/294 |
| 2010/0046869 A1 * | 2/2010 | Matsuyama | | 384/288 |
| 2010/0316313 A1 * | 12/2010 | Ishigo et al. | | 384/288 |
| 2011/0002563 A1 * | 1/2011 | Taguchi et al. | | 384/29 |
| 2011/0058761 A1 * | 3/2011 | Ishigo et al. | | 384/288 |
| 2012/0128286 A1 * | 5/2012 | Kondo et al. | | 384/397 |
| 2012/0148179 A1 * | 6/2012 | Kondo et al. | | 384/286 |

FOREIGN PATENT DOCUMENTS

| | | |
|---|---|---|
| DE | 3905450 C2 | 8/1989 |
| DE | 199 53 576 A1 | 6/2001 |
| DE | 10156344 A1 | 5/2002 |
| FR | 738 343 A | 12/1932 |
| GB | 1128370 | 3/1966 |
| JP | S52113445 A | 9/1977 |
| JP | S55012180 U | 1/1980 |
| JP | H05202936 A | 8/1993 |
| JP | 2002155946 A | 5/2002 |
| JP | 2004244177 A | 9/2004 |
| JP | 2009068511 A | 4/2009 |
| JP | 2010 116953 A | 5/2010 |

* cited by examiner

STRUCTURED DIRT DEPOSITORY IN SLIDING BEARING SURFACES

BACKGROUND OF THE INVENTION

The invention relates to sliding bearings having at least one groove formed on the sliding surface, which extends at least in part in the axial direction of a mounted shaft and ends at at least one end before the edge of the bearing and is open at the edge.

RELATED ART

The sliding surfaces of sliding bearings are profiled for various reasons. For example, in DE 39 05 450 C2 it was proposed to provide sliding bearings with grooves that are filled with a soft material so that the harder material alternates with the softer material in the sliding surface in order to achieve a better wear resistance and fatigue strength.

GB 1,128,370 A describes a lubricant-free bearing in which recesses are formed in the sliding surface in the form of grooves or pockets to convey dirt particles out of the bearing. Foreign bodies that penetrate into the bearing are collected in the recesses and are transported in the direction of rotation of the shaft along the flanks of the recesses and conveyed out of the bearing at the ends of the bearing.

DE 101 56 344 A1 describes a bearing element that has an oil groove on the sliding surface, which extends in the circumferential direction. Plural narrow grooves are formed on the sliding surface at a specific angle as regards the rotational direction of the shaft from the oil groove to the axial end side of the sliding surface to guide lubricating oil from the oil groove during the circumferential movement of the shaft from the inside to the axial end side.

Sliding bearings in internal combustion engines are the subject of continuous further development. Continuously greater stress is occurring in internal combustion engines and therefore also in sliding bearings. At the same time, the size of engines is being reduced. Moreover, ever thinner oils are being used to reduce friction. This results in that the thickness of the lubricating films, which prevents contact between the bearing and the shaft, is constantly becoming less. Owing to the reduced thickness of the lubricating films, also very small foreign particles are increasingly being pressed by the shaft into the bearing, that up until now had been washed out laterally.

Furthermore, the structure of the bearing shell is changing. Lead, that has very good sliding properties, is being replaced by other elements. The stress capacity of the bearing is also being increased, and this is resulting in a greater susceptibility to external influences. Layers that withstand great stress are as a rule thinner and harder than conventional layers and this entails a lesser embeddability, i.e. the capability to embed hard particles into the sliding surface to reduce wear. By substituting lead-containing layers, the remaining slidability of a damaged layer is also reduced. The substrate of lead-free materials is as a rule also harder than conventional lead-bronze materials. This also reduces the embeddability, with the consequentially reduced operational safety of the bearing. If there is an intrusion of particles, the bearing will therefore be damaged to a greater extent than hitherto, and this can result in a total failure of the tribosystem. Foreign particles can have various origins and can reach the oil circuit in different ways. For example, the particles can stem from original dirt or be the result of the production of component production, they can also reach the oil circuit during maintenance work (change of oil) or can consist of residues from combustion.

Contaminants, in particular small particles, are pulled over the sliding surface in the high-stress area of the bearing at a large angle before they are embedded into the bearing metal. As a rule, this results in greater scoring and in damage far into the stress zones, which in turn can result in failure of the bearing.

In extreme cases, the foreign body tries to leave the bearing in the area of least resistance, i.e. in the area of exposure (the greatest width of the gap), and is carried as a consequence of the wedge effect between the shaft and exposure by the shaft up until deep into the stressed areas of the bearing.

SUMMARY OF THE INVENTION

To counteract the problems outlined above, the background of the invention is, and one object of the invention consists in, the reduction of the susceptibility of a bearing as regards the impact of foreign particles.

The sliding bearing according to the invention comprises at least one groove formed on the sliding surface, which extends at least in part, and preferably for the most part, in the axial direction of a mounted shaft. The one or plural grooves are recesses having the shape of a channel or a furrow for embedding critical dirt particles. The one or plural grooves end in axial direction at least one, preferably both, ends before the edge of the bearing. The dirt particles are embedded into the grooves or are washed out of the bearing because the grooves do not come up to the edge. At the same time, a quick lateral carrying away of the lubricating film is avoided owing to the grooves. The grooves are deeper than 50 μm and/or wider than 100 μm, and are therefore suited as grooves for embedding particles or dirt particles. With the incorporated grooves, the particles damage at the most the surface up to the next closest groove and are then embedded therein. By this, the damaged surface is reduced and the probability of a failure of the bearing is drastically lowered. In the case of lubricated sliding bearings, the lubricant to be found in the grooves assists, when there are high proportions of mixed friction (body contact friction>fluid friction), that the temperatures are transferred out of the critical zones and the coefficient of friction is lowered by its lubricating effect. This effect can reduce a failure of the bearing owing to thermal seizure.

Preferably the one or the plural grooves have a depth of up to 80 μm to allow an embedding of particles without an excessive reduction of the integrity of the sliding surface.

For the same reason, the one or the plural grooves have a width of up to 150 μm. Of course, if there are plural grooves there can be different dimensions provided in order to take into account, for example, various types of contamination. Furthermore, one single groove can also vary along its length as to its width and/or depth.

Preferably the one or the plural grooves are provided at an inclination relative to the axial direction of a mounted shaft, in which the spacing, the number as well as the angle of the grooves can vary. The arrangement of the grooves is preferably traverse or diagonal to the running direction of the shaft in order to reduce the hydrodynamic impact of the grooves.

For the same reason, at least two grooves are formed in the axial direction, one next to the other, at an inclined position facing in different directions. The grooves can also intersect.

Preferably plural grooves are formed in a certain area of the sliding surface, in particular in groups, at a position facing different directions. The grouping can occur, for example, with a view to the stress distribution on the sliding surface.

Preferably the sliding surface is a connecting-rod bearing where a high degree of reliability against failure is to be ensured.

The incorporation of the grooves can take place by lasering, embossing, corroding, impacting, ECM, laser cutting, grinding or rolling. By this means, the sliding surface is profiled by expending thereby only slightly more effort.

To simplify production, the groove is formed preferably during a final processing step or before further coating procedures.

Preferably the groove is formed directly in a sliding layer of the sliding surface in order to reduce the surface damaged by scoring in the stress area of the bearing. The structuring can be introduced in three-material bearings in the substrate material (for example bronzes) in the last step or before further coating processes. With two-material layers (for example of aluminium) the grooves are incorporated directly into the sliding layer.

Preferably any eruptions and/or burrs and/or bars in the environment of the groove are removed after formation of the groove in order to improve the quality of the sliding surface.

Preferably the one or the plural groups are located outside of the high stress area. This means that in particular the exposure areas are free of grooves of the above-mentioned type. An exposure area is understood to be an area at the bearing ends of a bearing shell which forms the bearing, in which the wall strength of the bearing shell is reduced in comparison to the wall strength of the remaining bearing shell. In this manner, the wear of a shaft running in the bearing shell owing to the inexactness at the connecting points of the two bearing shells can be reduced.

Preferably the one or plural groups are embedded such that they extend in the areas of the bearing shell that are stressed both to a high as well as to a low extent. The low stress area can be an exposure area or can include the stressed lid shell of the bearing shell. By this means, the dirt is sluiced out of the higher stress area into a lower stress area where this is then embedded. Owing to this, the dirt cannot destroy any further components in the oil circuit. In particular, the groove is embedded for this in the rotational direction.

The preferred location of the grooves outside the high stress area of the bearing or the bearing shell and the dimensioning of the grooves is the reason for the suitability for small or very small foreign particles. In order to make the bearing stronger also as regards the impact of larger foreign particles, the above-mentioned grooves can be combined with depositories on the sliding surface and/or in an oil-supply groove of the bearing. Put more exactly, the one or the plural depositories can be located both on the sliding surface as well as also on a surface of the oil-supply groove, which are jointly designated as depository surface. The depository is a recess that is open towards the depository surface. The depository extends into the bearing, this means that in the case of a depository of the sliding surface in the axial direction towards the bearing back. The depository is restricted by one or plural depository walls and thus forms a pocket-like recess, a pocket hole, a through-hole or the like. The preferred direction of the depository angle in the direction towards the bearing back is dependent on the shaft rotation direction, i.e. such that collected foreign bodies cannot be washed out of the depository. Put more exactly, the depository wall forms in the extension direction with a reference direction an acute angle, with the reference direction being selected to be parallel to the tangent of the depository surface at the intersection of the depository wall with the depository surface. With this, the angle is selected that is formed of the depository wall in the direction of extension and the tangent in the direction away from the depository. In other words, at least one depository wall is incorporated at an inclination to the bearing, i.e. such that when the shaft rotates in the bearing a foreign body in the depository cannot be washed out from the depository, on the contrary it gets wedged therein. By this means, the dangerous foreign bodies are fixed in the one or the plural depositories, by which damage to the functional surface of the bearing is avoided or at least reduced. The function of the bearing system is thus maintained even in extreme cases. Even with main bearings, depositories can also be integrated into the oil supply groove of a bearing or a bearing shell in order to prevent that foreign bodies are washed by the flow of oil into the sliding surfaces of the bearing. In such a case, the direction of incorporation of the depository as defined more exactly above is such that the directed oil flow cannot wash out foreign bodies from the depository.

Preferably the depository for fixation of the foreign bodies is a pocket hole. In this case, the depository does not penetrate through the back of the bearing, which can be sensible depending on the production method or the field of use of the bearing. Furthermore, a depository of this kind can be easily produced.

On the other hand, the depository can penetrate the back of the bearing and thus be configured as a through-hole so as by this means to maximize the holding capacity and/or to be able to discharge larger foreign particles out from the bearing.

Preferably the sliding bearing comprises an exposure area and the depository is provided in the area or in the vicinity of the exposure area. In principle, it is to be achieved that the one or plural depositories are provided if possible not in the main stress zone of the bearing so as to fix the dangerous foreign bodies in the depository in the non-stress area of the bearing. Furthermore, the discharge of the foreign body from the oil-discharge bore is to be expected in the vicinity of the exposure area or the exposure areas. Since the depositories are provided preferably for larger particles, an arrangement of the depositories in low-stress areas of the bearing does not worsen the depository capability of the particles in the depositories.

For the same reason the depository is provided preferably at the edge area of the bearing, as seen in axial direction, i.e. in the vicinity of the side where the shafts enter or exit. This is supposed to prevent that the foreign particles reach the high stress areas of the bearing.

The holding capacity of the depository preferably corresponds to the multiple volume of foreign bodies present in the engine, i.e. particles with a dimension of a maximum of approximately 3 mm×2 mm×1 mm or 2 mm×2 mm×2 mm or a diameter of up to 2 mm diameter, etc.

Preferably, as regards a minimum effort in production, the depository is incorporated by means of embossing, boring or punching.

Preferably the cross-section of the depository perpendicular to the direction of extension of the depository is cylindrical, or oval or rectangular so as to easily produce a local, pocket-like recess.

Preferably a filler is introduced into the depository that is softer than the material of the bearing. In this case, the foreign bodies are better fixed against being washed out. Moreover, the hydrodynamic lubricating film structure cannot be destroyed by edges when the film material is flush with the depository surface.

Preferably the softer material comprises elastomers, metals, alloys and/or a metal foam.

Preferably plural depositories are provided that can be equipped with the above-described properties. For this, not all depositories have to have the same configuration, position, size, etc., but can be different and can meet different requirements or partial requirements.

Preferably exactly one depository is provided in a shell bearing in order to avoid excessive damage to the running surface. The bearing comprises in this case exactly two depositories.

The sliding bearing as according to the invention can comprise preferably at least one dirt guiding groove formed on the slide surface, which extends at least in part more in the circumferential direction of the bearing shell than in the axial direction of a shaft mounted therein. Even where mention is made below of a dirt guiding groove, plural dirt guiding grooves can be provided. The inclination of the dirt guiding groove with a preferred extension in the circumferential direction causes an effective transportation of foreign particles owing to the oil-flow direction and the rotation of a shaft mounted in the bearing shell. For this reason, the one or plural dirt guiding grooves is/are embedded preferably in the rotational direction. In order to effectively wash the dirt out of the bearing and to avoid damage to the bearing owing to the foreign particles, the dirt guiding groove extends up to an edge of the bearing, i.e. up to one of two edges in axial direction of a shaft mounted in the bearing, and this is open at the edge. The dirt particles that are transported by the dirt guiding groove to the edge can thus be discharged to the outside. The dirt that is discharged in this manner arrives in the oil sump and is filtered during the next pumping cycle for example through a filter and out of the oil flow. The dirt guiding grooves can be incorporated by embossing, punching, screwing in, etc. into the sliding surface of the lubricated sliding bearing. Furthermore, the dirt guiding grooves can vary as regards their length, width, depth, geometry and position, by which an adaption to the distribution of form and size of dirt particles occurring can be undertaken. With the incorporated dirt guiding grooves, particles damage at the most the surface up to the next closest dirt guiding groove and are then transported to the outside by the dirt guiding groove. By this damaged surfaces are reduced and the probability of failure of the bearing is drastically reduced. Furthermore, the lubricant in the dirt guiding groove helps to transfer temperatures out from the critical zones when there are high proportions of mixed friction (body contact friction>liquid friction) and reduces the coefficient of friction by its lubricating effect. This effect can reduce the failure by the bearing by thermal seizure.

Preferably the dirt guiding groove is up to 80 μm deep in order to allow collection and transportation away of particles without an excessive reduction of the integrity of the sliding surface. For the same reason, the dirt guiding groove is preferably up to 150 μm wide. Of course, plural dirt guiding grooves can have these or other properties of preferred embodiments. In particular, should there be plural dirt guiding grooves, different dimensions can be provided to take into account the different types of dirt. Furthermore a dirt guiding groove can vary along its extension as regards its width and/or depth and/or its cross-section.

Preferably at least two dirt guiding grooves are formed in the axial direction, one next to the other, at inclinations facing in different directions. The spacing, the number as well as the angle of the dirt guiding grooves can vary here. The hydrodynamic impact of the dirt guiding grooves can be reduced by the inclined arrangement of the dirt guiding grooves towards the shaft running direction. For this reason and in order to avoid a one-sided stress, a symmetrical arrangement of the grooves is preferred should there be plural dirt guiding grooves. In particular, the axis is to be considered as the symmetry axis that has no axial components and extends in the centre of the sliding surface.

Preferably a centre groove is provided that is characterized in that it does not have any axial components. The centre groove can be closed around its circumference or on both sides. The centre groove also communicates with at least one of the dirt guiding grooves. Transportation of dirt particles in the circumferential direction is effected by the centre groove in order to transport the dirt particles to a dirt guiding groove that thereafter undertakes to convey the particles to the outside. It is preferred here that the centre groove transports the foreign particles first out of a high stress area of the bearing into lesser stress areas, for example in the exposure areas that are preferably provided before the dirt particles are discharged to the outside. An exposure area is understood to be an area at the bearing ends of a bearing shell which forms the bearing in that the wall strength of the bearing shell is reduced as compared to the wall strength of the remainder of the bearing shell. By this means, the wear on one of the shafts running in the bearing shell owing to the inexactness at the connecting points of the two bearing shells can be reduced. Plural centre grooves can be provided. Preferably the centre groove extends in the middle of the sliding surface, i.e. on the symmetrical axis defined above.

Preferably two dirt guiding grooves are arranged in a V. The two dirt guiding grooves extend outwardly from a joint starting point in the area of the bearing that is centre to the axial direction in a respective opposite axial direction. The inclination is preferably symmetrical.

Preferably two pairs of dirt guiding grooves, each arranged in 2 Vs, are provided which, as described above, extend outwardly each in opposite axial direction from a joint starting point in the area of the bearing that is centre in axial direction, with the two starting points being connected by a centre groove. Such an arrangement is suitable, for example, for a lubricated sliding bearing without a defined rotational direction when the two Vs are formed to be opposite in the circumferential direction.

Preferably the dirt guiding grooves arranged in a V are in low-stress areas of the bearing, i.e. in particular in the exposure areas, where these are provided.

Preferably at least one dirt guiding groove is curved so as to minimize the impact of the groove on the hydrodynamic properties of the bearing.

Preferably at least two dirt guiding grooves intersect, by which an exchange between the dirt guiding grooves of dirt particles can take place.

Preferably 10 to 20 dirt guiding grooves are provided, by which a more effective transportation off of dirt is achieved.

Preferably plural dirt guiding grooves are formed in a specific area of the sliding surface, in particular in groups, with a differently aligned inclination. The grouping can take place, for example, in view of the distribution of stress on the sliding surface or the hydrodynamic impact of the grooves on the sliding bearing.

The incorporation of dirt guiding grooves can take place by lasering, embossing or rolling. By this means the sliding surface can be profiled with only minor additional effort. To simplify production, the dirt guiding groove is formed preferably during a final processing step or before further coating procedures.

Preferably the dirt guiding groove is formed directly in a sliding layer of the sliding surface so as to reduce the area damaged by the formation of scoring in the stress area of the bearing. The structuring when there are three-material layers can be incorporated into the substrate material (for example bronze) in the last work step or before further coating procedures. When there are two-material bearings (for example aluminium), the dirt guiding groove is incorporated preferably directly into the sliding layer.

Preferably any eruptions and/or burrs and/or bars in the environment of the dirt guiding groove are removed after formation of the dirt guiding groove in order to improve the quality of the sliding area.

The method according to the invention for incorporation of grooves can be supplemented with one or more steps for the incorporation of one or more of the depositories and/or dirt guiding grooves and/or centre grooves given above into the sliding bearing or into a bearing shell.

DETAILED DESCRIPTION

Figure 1A:
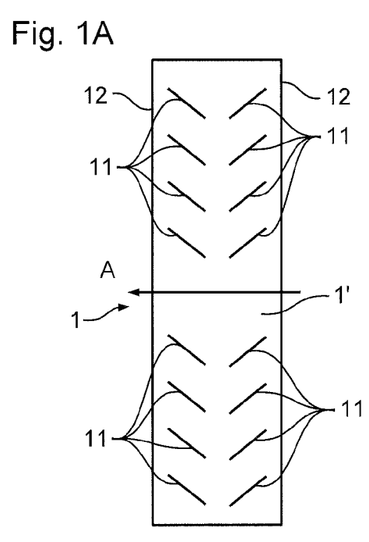
FIG. 1A to 1G show various arrangements of grooves on the sliding surface of a bearing shell, the sliding surface being unwound and shown in a top view.

FIGS. 1A to 1G are top views of an unwound sliding surface 1' of a bearing shell 1. In the sliding surface 1' embedding grooves 11 are incorporated that each have one non-zero axial component. In FIG. 1A the axial direction is shown using an arrow A. The grooves 11 contribute to the profiling of the sliding surface 1'. Two bearing shells 1 each form a bearing, but bearing shells 1 profiled similarly and differently with grooves 11 being able to be combined for the production of a bearing.

In the figures, plural grooves 11 are each compiled into groove groups.

Figure 1B:
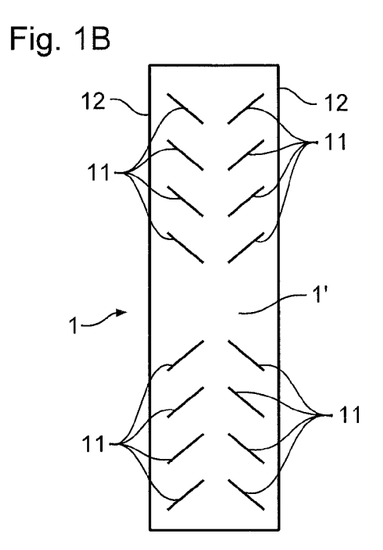
Figure 1C:
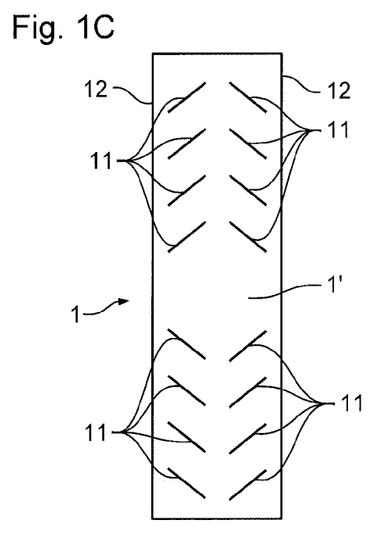
Figure 1D:
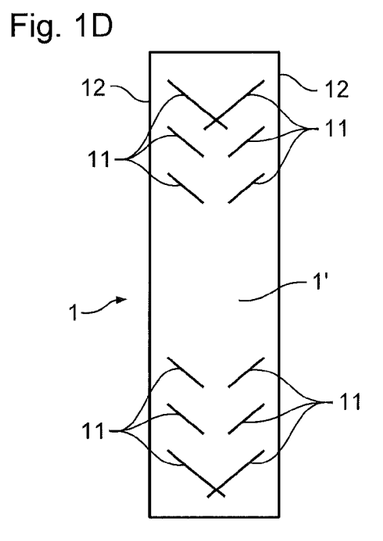
Figure 1E:
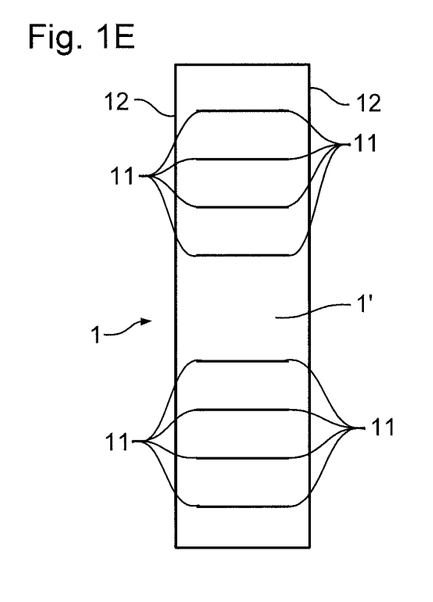
Figure 1F:
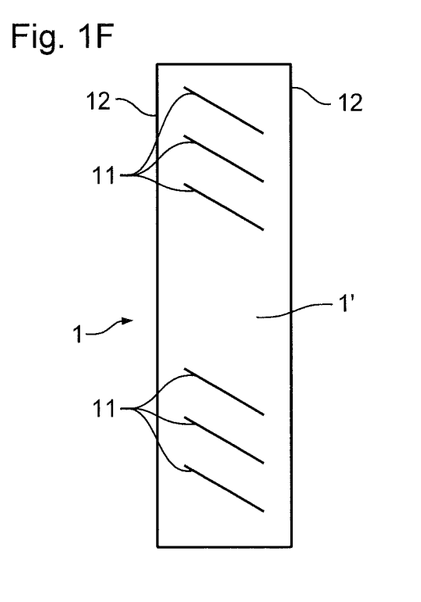
Figure 1G:
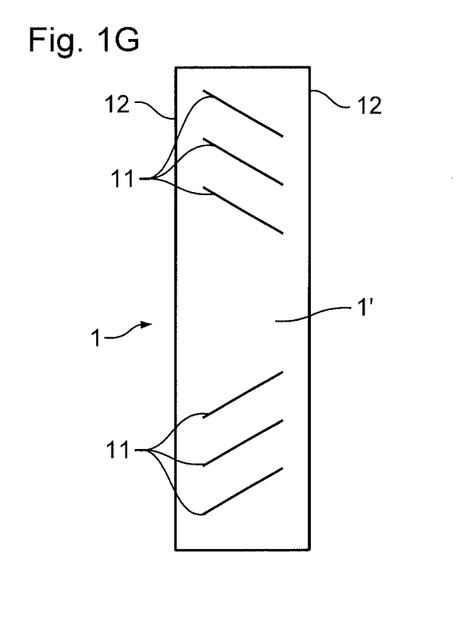

The grooves 11 can cross, as is shown in the examples of FIG. 1E, 1F and 1G, the centre area 12a of the bearing shell 1, or, as is shown I the FIG. 1A, 1B and 1C, can be grouped in the axial edge areas 12b such that the centre area of the bearing shell 1 remains unprofiled.

The grooves 11 each end before the lateral edge 12 of the bearing shell 1 to allow an embedding of the particles and to avoid a quick lateral carrying off of the lubricated film.

The grooves 11 can be provided traverse, as is shown in the example of FIG. 1E. It can be reasonable with the pre-given running direction of the rotating shaft to optimize the arrangement of the grooves 11 in view of the running direction. In this regard, the FIGS. 1A, 1B, 1C 1D, 1F and 1G show grooves 11 incorporated at an inclination to the running direction. In particular, the space, the number, as well as the angle of the grooves 11 can vary, as is shown in the FIG. 1A to 1G, in order to reduce the hydrodynamic effects from a cooperation of the grooves 11 with the lubricating film. Grooves 11 that intersect are shown in FIG. 1D.

Figure 2:
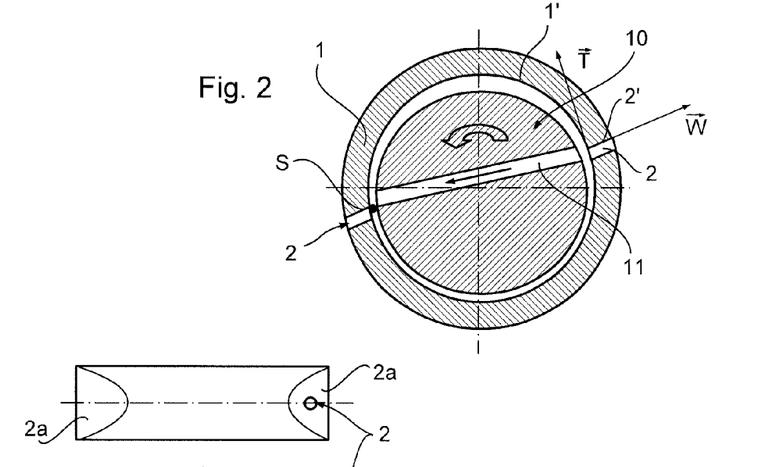
FIG. 2 shows a cross-section of a bearing formed of two bearing shells with a shaft incorporated therein, the bearing having two depositories.

FIG. 2 is a cross-section of a bearing formed of two bearing shells 1. In the bearing a shaft 10 is incorporated that comprises an oil channel having an oil discharge bore 11. The rotational direction of the shaft 10 is shown with an arrow in the upper area of the shaft. According to this, a main stress direction results that is shown with a double arrow. The oil flow direction through the oil discharge bore is also shown. The bearing shells 1 each have a sliding surface 1'. In the two bearing shells 1, one depository 2 is formed each. The depositories 2 have a cylindrical shape and penetrate the bearing backs. The depositories 2 are open towards the sliding surface 1'.

A dirt particle is designated using the reference sign S and is located on the path in the depository 2. By rotating the shaft, the particle is pressed into the depository 2 and is fixed there. The direction of incorporation of the depository 2 into the bearing shell 1 in the direction towards the back of the bearing is such that, corresponding to the rotational direction, the collected foreign bodies cannot be washed out of the depository 2. This means, with reference to FIG. 2, that the two vectors $\overline{W}$ and $\overline{T}$ shown form an acute angle. The vector $\overline{W}$ designates the direction of the depositary wall 2' in the direction of extension of the depository and in the area of the intersection of the depository wall 2' with the sliding surface 1'. The vector $\overline{T}$ designates the direction along the tangent of the depository surface at the intersection of the depository wall of the depository surface in the direction facing away from the depository 2.

It is noted that in FIG. 2 only a possible cross-section of the system of a bearing and a depository 2 is shown. The above condition of the angle of the vectors $\overline{W}$ and $\overline{T}$ should at least be met for an essential part of the depository wall in the axial direction of the bearing, so that the avoidance of a washing out of foreign particles is ensured.

The two depositories 2 are provided in FIG. 2 in the area of the bearing shell ends in which the exposure areas 2a can be provided. Furthermore, the depositories are located in the area of the oil discharge bore 13 of the shaft 10 (in axial direction).

Figures 3, 4:
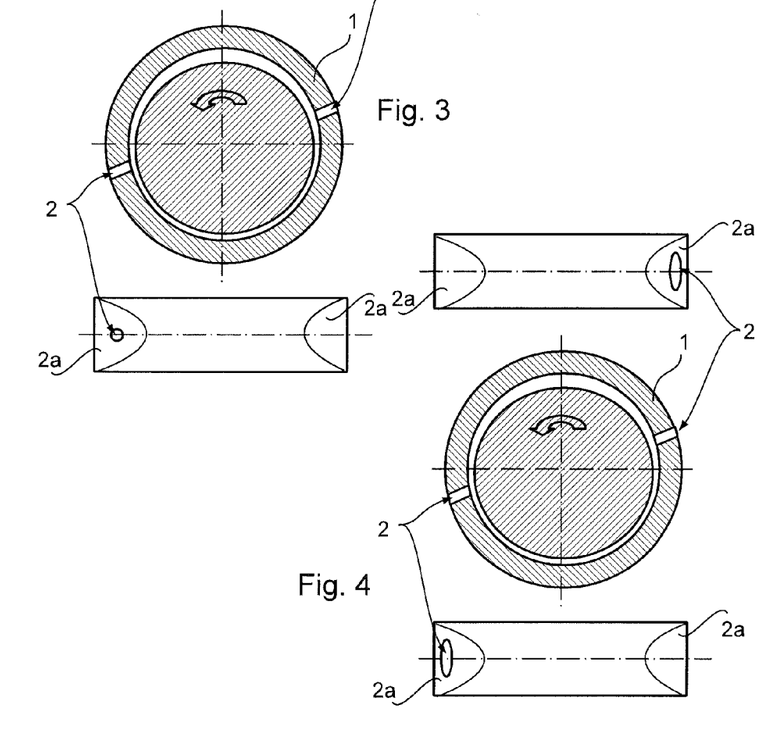
FIG. 3 shows a cross-section as according to FIG. 2 with a circular cylindrical depository cross-section.
FIG. 4 is a view as according to FIG. 2 with oval depository cross-section.
Figure 5:
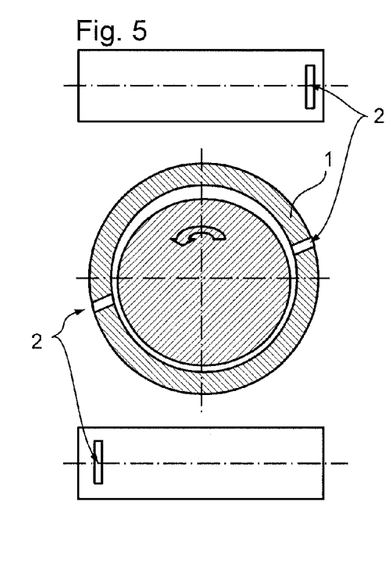
FIG. 5 is a view as according to FIG. 2 with a rectangular depository cross-section.

FIGS. 3, 4 and 5 each show a view as according to FIG. 2, where an unwound cross-section of the bearing below and above the bearing is shown. For example, cross-section forms of the depository 2 in the direction of incorporation of the depository 2 are visible. In FIG. 3 a circular cross-section, in FIG. 4 an oval cross-section and in FIG. 5 a rectangular cross-section are shown. It is to be noted that when plural depositories 2 are provided, that the depositories 2 do not have to have a uniform cross-section. The depositories 2 furthermore do not have to have uniform cross-sections along the incorporation direction, but can be formed as irregularly shaped recesses, pocket holes, through-holes, etc.

Figure 6:
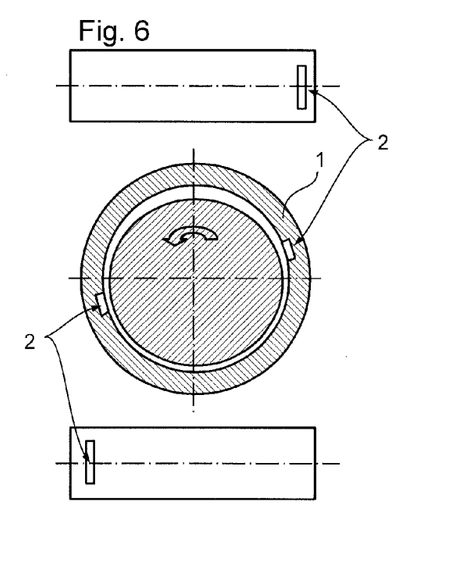
FIG. 6 is a view as according to FIG. 2 with depository pockets.

FIG. 6 is a view as according to FIG. 2, with the depositories 2 being formed as pocket-like recesses that do not penetrate the backs of the bearings. Of course, the cross-sections can be differently configured, as is shown in the previous embodiments.

Figure 7:
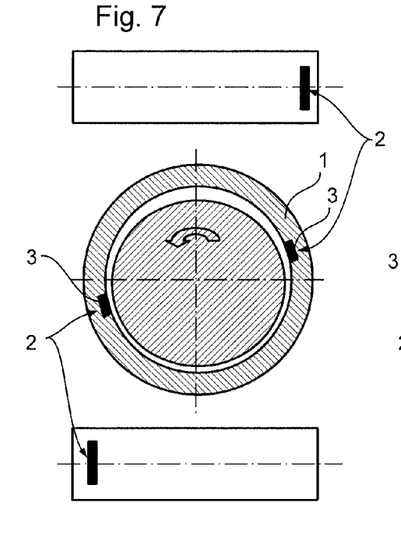
FIG. 7 is a view as according to FIG. 2 with depository pockets into which a filler is incorporated.
Figure 8:
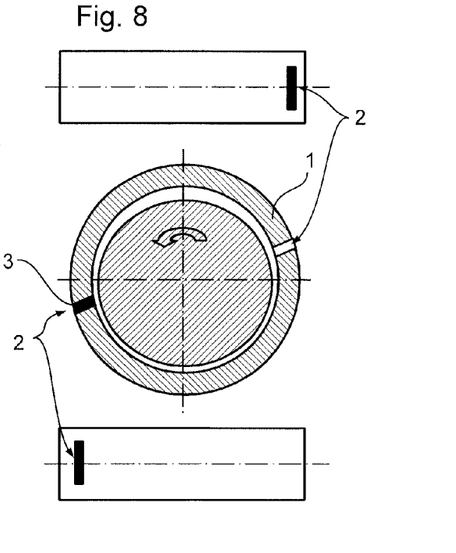
FIG. 8 is a view as according to FIG. 2 with a continuous depository, a filler material being incorporated into one depository.

FIG. 7 and FIG. 8 are views as according to FIG. 2, where in a few of the pocket-shaped depositories 2 and/or the throughholes that act as depositories 2 a filler 3 or filling material is introduced. The filler has the purpose of improving fixation of trapped foreign particles. Therefore, the filler consists preferably of a material that is softer than the sliding surface 1'.

Although it is not visible from the cross-section view, the bearing shells with the depositories 2 from FIG. 2 through 8 are equipped with an above-described profiling with grooves 11.

The FIG. 9A through 9F are top views of an unwound sliding surface 1' of a bearing shell 1. In the sliding surface 1' grooves 20 are incorporated that act as dirt guiding grooves for the transportation of foreign particles to the outside.

In FIGS. 9A, 9B, 9C, 9D and 9F the dirt guiding grooves 20 are formed as straight grooves and are inclined more greatly in the circumferential direction of the bearing shell than in the axial direction of a shaft provided in the bearing. The axial direction is shown using a dashed line A. In FIG. 9E the dirt guiding grooves 20 are curved and are inclined more greatly at least in the edge areas 12 of the bearing shell 1 in the circumferential direction than in the axial direction A.

In the projections shown, the circumferential direction of the bearing shell coincides with the rotational direction D shown in FIGS. 9B, 9D, 9E and 9F. In the examples of these figures, the arrangement of the dirt guiding grooves 20 is dependent on the rotational direction of the shaft, in contrast to which the embodiment examples of FIGS. 9A and 9C are suited for a bearing shell without a defined rotational direction.

The dirt guiding grooves 20 contribute to the profiling of the sliding surface 1'. Two bearing shells 1 form each one bearing, where similar or different bearing shells 1 profiled with dirt guiding grooves 20 can be combined for the production of a bearing.

The dirt guiding grooves 20 each project beyond the lateral edge 12 of the bearing shell 1 in order to transport to the outside dirt particles that are between the bearing shell and shaft. In FIGS. 9A and 9C, two pairs of dirt guiding grooves 20 each arranged in a V shape are provided symmetrically relative to an axis that does not have any axial components and extends in the centre of the sliding surface, i.e. it coincides with the arrow D. In FIG. 9D a V-shaped arrangement of two dirt guiding grooves 20 is shown.

Figure 9A:
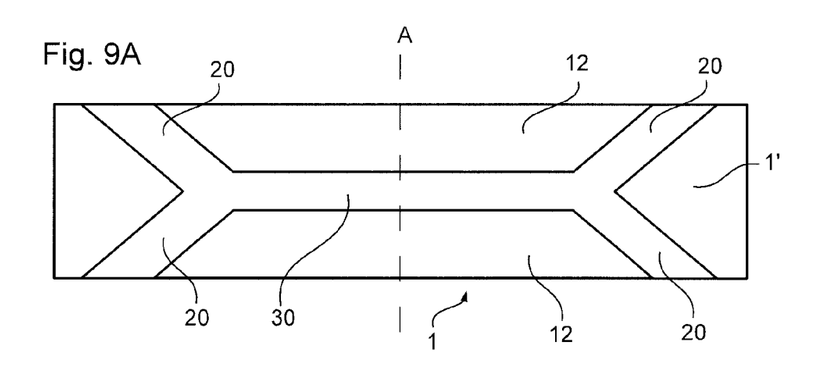
FIG. 9A to 9F are each top views of unwound sliding surfaces of lubricated sliding bearings with dirt guiding grooves.
Figure 9B:
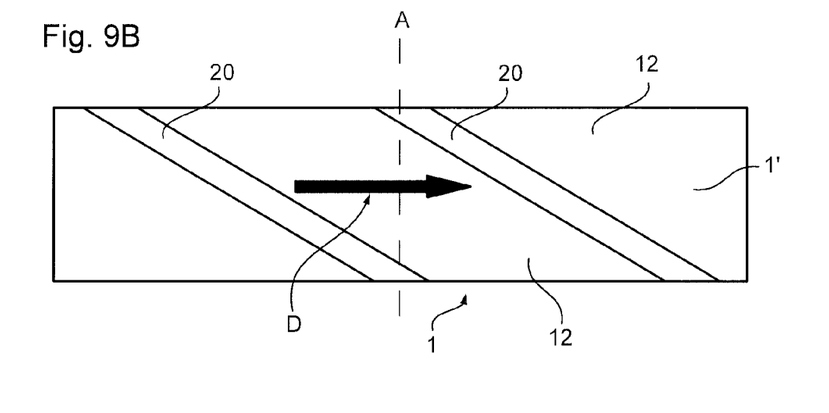
Figure 9C:
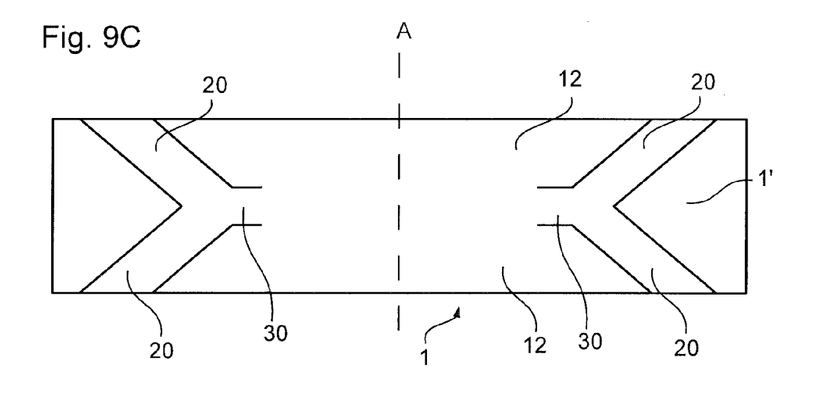
Figure 9D:
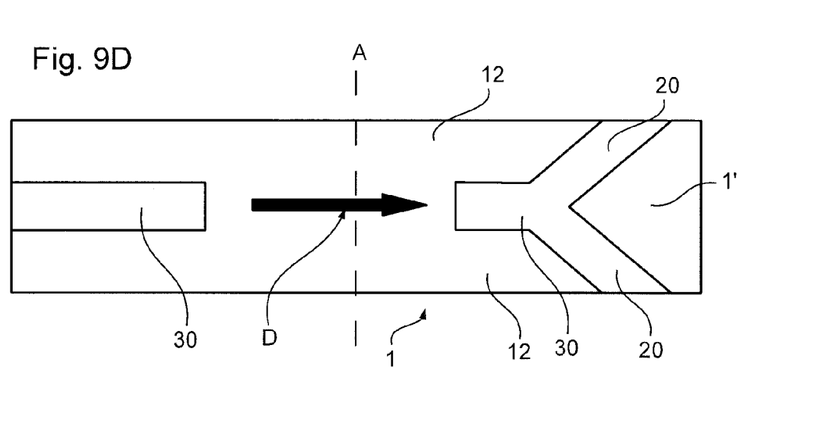
Figure 9E:
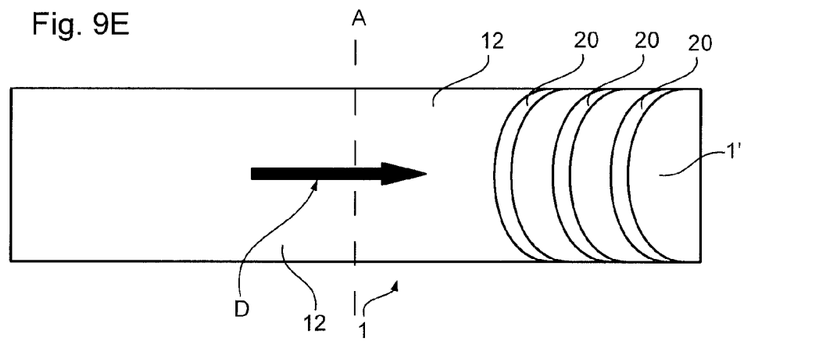
Figure 9F:
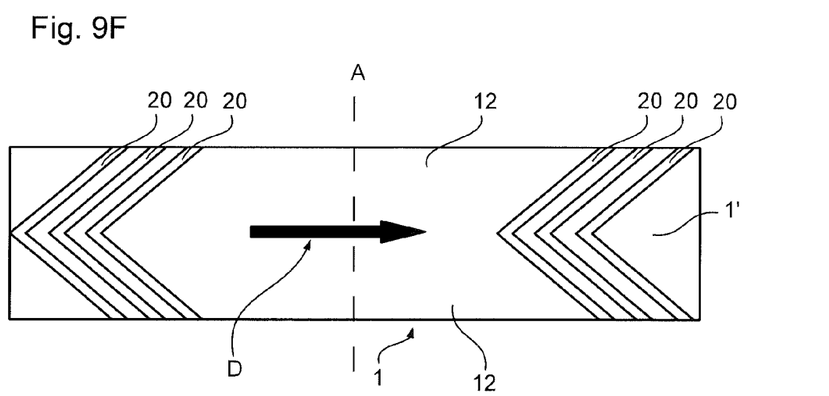

In FIG. 9A the two angular points of the Vs are connected by a centre groove 30 that extends in the circumferential direction of the bearing shell in order to ensure a quick supply of the dirt particles into the dirt guiding grooves 20. A supply of the dirt particles through the centre groove 30 to the V is also shown in FIG. 9C with the help of two centre grooves 30. A further arrangement with centre grooves 30 is shown in FIG. 9D. In the embodiment examples with one or two centre grooves 30, the centre grooves 30 are equipped with closed ends or ends opening up into the dirt guiding grooves 20. The centre grooves 30 can, however, also be formed as continuous circumferential grooves. Furthermore, plural centre grooves 30 can be provided at different axial positions.

A V-shaped arrangement of dirt guiding grooves 20 that differs from the dirt guiding grooves 20 arranged in a V shape as shown above is shown in FIG. 9F, where V grooves are provided in groups and a total of two groups with plural dirt guiding grooves 20 are incorporated in the sliding surface 1'.

The invention claimed is:

1. A sliding bearing comprising:
   at least one groove formed on a sliding surface of said sliding bearing, which at least one groove extends at least in part in an axial direction of the bearing, which at least one groove ends at least one end before an edge of the bearing and is deeper than 50 μm or wider than 100 μm or both deeper than 50 μm and wider than 100 μm so that dirt and/or particles can be embedded, and
   at least one depository on a depository surface formed as pocket hole, wherein the pocket hole is a hole which does not penetrate through a back of the bearing, and which depository surface is the sliding surface, wherein the at least one depository formed as a pocket hole is open towards the depository surface, has a depository wall and extends away from the depository surface into the bearing, and wherein a corner is formed at the intersection of the depository wall with the sliding surface, the corner being formed with an acute angle.

2. The sliding bearing according to claim 1, wherein the at least one groove is up to 80 μm deep.

3. The sliding bearing according to claim 1, wherein the at least one groove is up to 150 μm wide.

4. The sliding bearing according to claim 1, wherein the at least one groove is at an inclination to the axial direction.

5. The sliding bearing according to claim 1, wherein the at least one groove comprises at least two grooves formed in the axial direction one next to the other and having an inclination in different directions.

6. The sliding bearing according to claim 5, wherein the at least two grooves intersect.

7. The sliding bearing according to claim 5, wherein the at least two grooves comprises a set of 10 to 20 grooves.

8. The sliding bearing according to claim 1, wherein said at least one groove comprises four groupings, each including a plurality of grooves and wherein the grooves of each grouping are inclined in the same axial direction, and wherein the axial direction of inclination of said grooves of any one grouping is different than the axial inclination of said grooves of at least two adjacent groupings.

9. The sliding bearing according to claim 1, wherein the sliding bearing is a connecting-rod bearing.

10. The sliding bearing according to claim 1, wherein the sliding bearing has an exposure area and the depository is provided in the area of the exposure area.

11. The sliding bearing according to claim 1, wherein the depository is provided at an area at the edge of the bearing in axial direction.

12. The sliding bearing according to claim 1, wherein a filler is disposed in the depository, which is softer than the material of the bearing.

13. A method for the production of a sliding bearing, in which at least one groove is formed on a sliding surface of the sliding bearing, which at least one groove extends at least in part in an axial direction of the bearing, and which at least one groove ends at least one end before the edge of the bearing and is more than 50 μm deep, or more than 100 μm wide, or more than 50 μm deep and more than 100 μm wide;
   forming a depository as a pocket hole on a depository surface which is wherein the depository is formed to be open towards the depository surface, wherein the pocket hole is a hole which does not penetrate through a back of the bearing, and to include a depository wall and to extend away from the depository surface into the bearing, and
   wherein a corner is formed at the intersection of the depository wall with the sliding surface, the corner being formed with an acute angle.

14. The method according to claim 13, wherein the at least one groove is formed by lasering, embossing or rolling.

15. The method according to claim 13, wherein the at least one groove is formed during a final processing step or before further coating processes.

16. The method according to claim 13, wherein the at least one groove is formed directly in a sliding layer of the sliding surface.

17. The method according to claim 13, wherein after the formation of the at least one groove any eruptions and/or burrs and/or bars in the vicinity of the groove are removed.

\* \* \* \* \*